US011792706B2

(12) United States Patent
Yao et al.

(10) Patent No.: US 11,792,706 B2
(45) Date of Patent: Oct. 17, 2023

(54) UPLINK TRANSMISSION FOR DUAL ACTIVE PROTOCOL STACK HANDOVER

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Fangli Xu, Beijing (CN); Haijing Hu, Beijing (CN); Haitong Sun, Irvine, CA (US); Hong He, Cupertino, CA (US); Jie Cui, San Jose, CA (US); Oghenekome Oteri, San Diego, CA (US); Weidong Yang, San Diego, CA (US); Wei Zeng, San Diego, CA (US); Yang Tang, Cupertino, CA (US); Yuchul Kim, Santa Clara, CA (US); Yuqin Chen, Shenzhen (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 17/053,674

(22) PCT Filed: Nov. 7, 2019

(86) PCT No.: PCT/CN2019/116253
§ 371 (c)(1),
(2) Date: Nov. 6, 2020

(87) PCT Pub. No.: WO2021/087864
PCT Pub. Date: May 14, 2021

(65) Prior Publication Data
US 2022/0264410 A1 Aug. 18, 2022

(51) Int. Cl.
*H04W 4/00* (2018.01)
*H04W 36/18* (2009.01)
(Continued)

(52) U.S. Cl.
CPC ....... *H04W 36/18* (2013.01); *H04L 27/26025* (2021.01); *H04W 36/0069* (2018.08); *H04W 56/0045* (2013.01)

(58) Field of Classification Search
CPC ............. H04W 36/00; H04W 36/0005; H04W 36/0058; H04W 36/0061; H04W 36/0069;
(Continued)

(56) References Cited

U.S. PATENT DOCUMENTS 8,831,611 B2 9/2014 Koo et al.
10,660,113 B2 5/2020 Xu et al.
(Continued)

FOREIGN PATENT DOCUMENTS

WO 2012061765 A 5/2012
WO 2020200151 A1 10/2020

OTHER PUBLICATIONS

Qualcomm Inc, et al. "UL TDM aspects of enhanced MBB HO using Dual Active Protocol Stack"; 3GPP TSG-RAN WG2 Meeting #197 bis R2-1912838: Chongqing, China; 9 pages: Oct. 14, 2019 (Year: 2019).*
Qualcomm Ing, et al. "LTE UE capability sharing aspects for DAPS based enhanced MBB HO"; 3GPP TSG-RAN WO2 Meeting #107bis R2-1912822: Chongqing, China: 7 pages; Oct. 14, 2079 (Year: 2019).*
(Continued)

*Primary Examiner* — Matthew W Genack
(74) *Attorney, Agent, or Firm* — Kowert, Hood, Munyon, Rankin & Goetzel, P.C.

(57) ABSTRACT

Apparatuses, systems, and methods for performing uplink transmissions during a dual active protocol stack handover. A wireless device may determine a propagation delay between the wireless device and each of a source cell and a target cell of a dual active protocol stack handover by the wireless device. The wireless device may provide an indication to the source cell of the propagation delay between the wireless device and the source cell, the propagation delay between the wireless device and the target cell, and a
(Continued)

propagation delay difference handling capability of the wireless device. The cellular base station that provides the source cell may determine a time division multiplexing pattern for uplink communication for the wireless device during the dual active protocol stack handover based at least in part on the information provided by the wireless device.

17 Claims, 8 Drawing Sheets

(51) Int. Cl.
*H04W 36/00* (2009.01)
*H04L 27/26* (2006.01)
*H04W 56/00* (2009.01)

(58) Field of Classification Search
CPC ..... H04W 36/16; H04W 36/18; H04W 36/24; H04W 36/249; H04W 56/004; H04W 56/0045; H04W 56/005; H04W 56/0055; H04W 56/0065; H04L 27/2601; H04L 27/2602; H04L 27/26025
See application file for complete search history.

(56) References Cited

U.S. PATENT DOCUMENTS

| | | | |
|---|---|---|---|
| 10,687,263 | B2 | 6/2020 | Paladugu et al. |
| 2004/0179555 | A1 | 9/2004 | Smith |
| 2015/0280871 | A1 | 10/2015 | Xu et al. |
| 2019/0253945 | A1 | 8/2019 | Paladugu |
| 2020/0314714 | A1 | 10/2020 | Jung et al. |

OTHER PUBLICATIONS

International Search Report and written Opinion for PCT/CN2019/116253, dated Jul. 28, 2020, 8 pages.
ZTE Discussion on NR Mobility Enhancements in Physical Layer 3GPP TSG RAN WG1 #98bis R1-1910112, Oct. 20, 2019.
Extended European Search Report for EP Patent Application No. 19951518.0; 12 pages; dated Sep. 16, 2022.
Qualcomm Inc, et al. "UL TDM aspects of enhanced MBB HO using Dual Active Protocol Stack"; 3GPP TSG-RAN WG2 Meeting #107bis R2-1912838; Chongqing, China; 9 pages; Oct. 14, 2019.
Qualcomm Inc, et al. "LTE UE capability sharing aspects for DAPS based enhanced MBB HO"; 3GPP TSG-RAN WG2 Meeting #107bis R2-1912822; Chongqing, China; 7 pages; Oct. 14, 2019.

* cited by examiner

FIG. 9

Source cell UL slot | Target cell UL slot ⋯

*Target and source in the same TAG*

FIG. 10

Source cell UL slot | Guard period | Target cell UL slot ⋯ Target cell UL slot | Source cell UL slot ⋯

*Target and source in different TAG, T_ps<T_pt*

FIG. 11

Source cell UL slot | Target cell UL slot ⋯ Target cell UL slot | Guard period | Source cell UL slot ⋯

*Target and source in different TAG, T_ps>T_pt*

UPLINK TRANSMISSION FOR DUAL ACTIVE PROTOCOL STACK HANDOVER

PRIORITY DATA

This application claims benefit of priority to Patent Cooperation Treaty Application No. PCT/CN2019/116253, titled "Uplink Transmission for Dual Active Protocol Stack Handover", filed Nov. 7, 2019, which is hereby incorporated by reference in its entirety as though fully and completely set forth herein.

FIELD

The present application relates to wireless devices, and more particularly to apparatuses, systems, and methods for a wireless device to perform uplink transmissions during a dual active protocol stack handover.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for a wireless device to perform uplink transmissions during a dual active protocol stack handover.

According to the techniques described herein, a wireless device may determine the propagation delays between the wireless device and each of a source cell and a target cell of a dual active protocol stack handover. The wireless device may report the propagation delays, as well as certain capability information for the wireless device to the source cell. The capability information could include an indication of whether the wireless device supports dual active protocol stack handover, a propagation delay difference between cells that the wireless device can handle without dropping an uplink transmission when switching uplink transmissions from one cell to another during a dual active protocol stack handover, and/or any of various other types of information.

Based on the information reported by the wireless device, the source cell may determine whether to insert any guard periods into a time division multiplexing pattern for uplink transmissions by the wireless device during the dual active protocol stack handover, and may determine a time division multiplexing pattern accordingly. The source cell and the target cell may coordinate to adhere to the time division multiplexing pattern when scheduling uplink transmissions for the wireless device.

At least according to some embodiments, the techniques described herein may thus provide a cellular network with the knowledge to determine when a scenario in which a wireless device would be forced to drop an uplink transmission during a dual active protocol stack handover could occur, and the capability to avoid such scenarios by including one or more guard periods in the time division multiplexing pattern for dual active protocol stack handover uplink transmissions for the wireless device.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 9-11 illustrate aspects of various possible time division multiplexing schedule examples for uplink communication during a dual active protocol stack handover, according to some embodiments.

Figure 1:
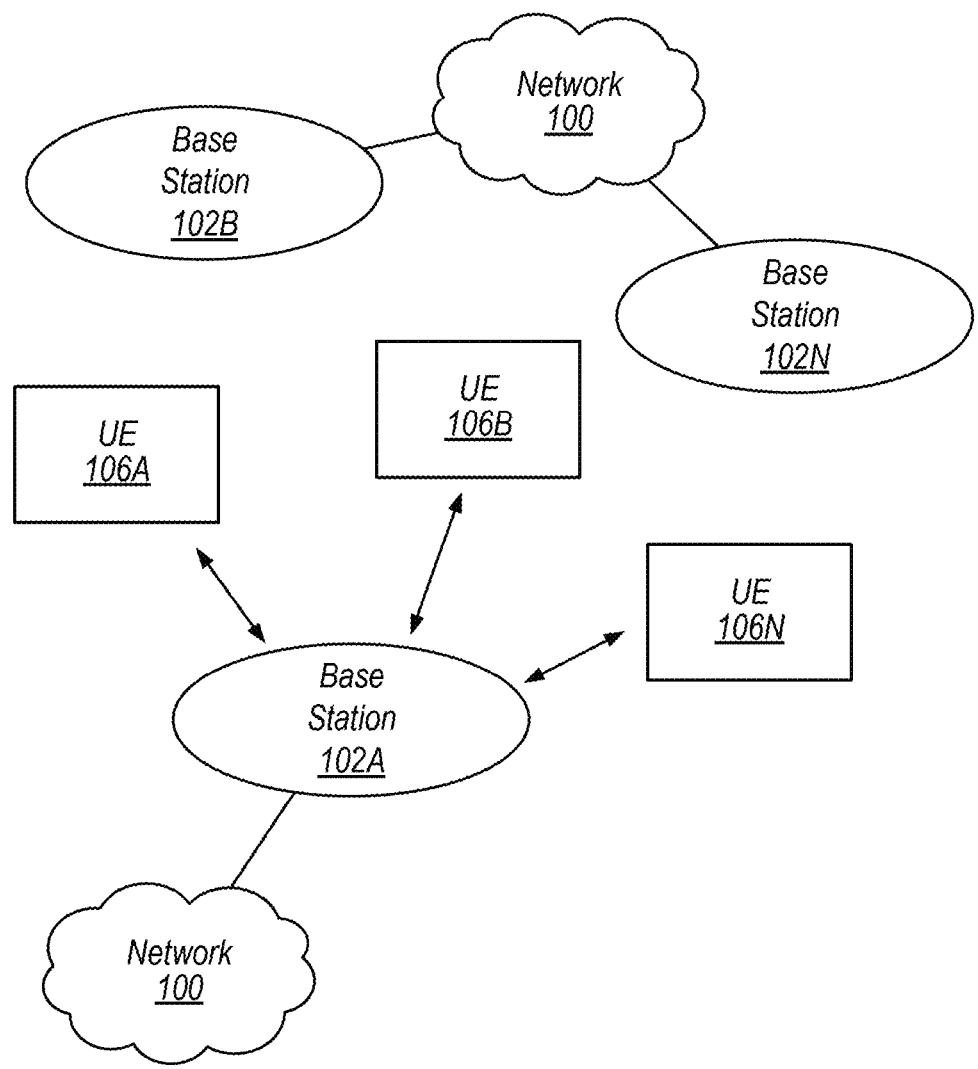
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
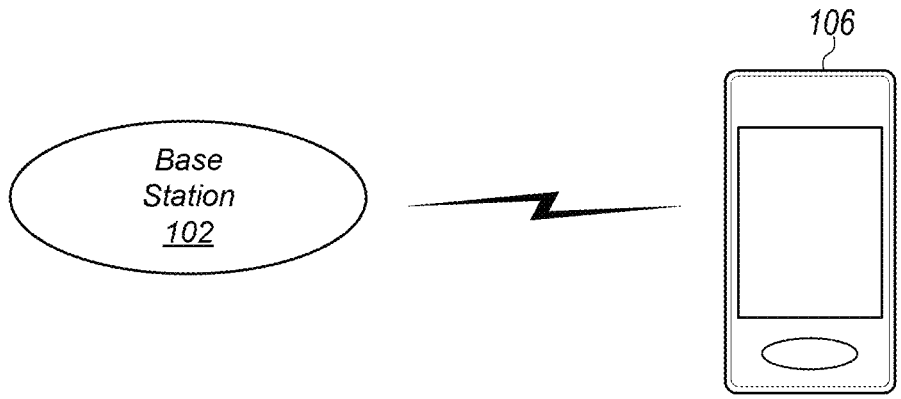
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
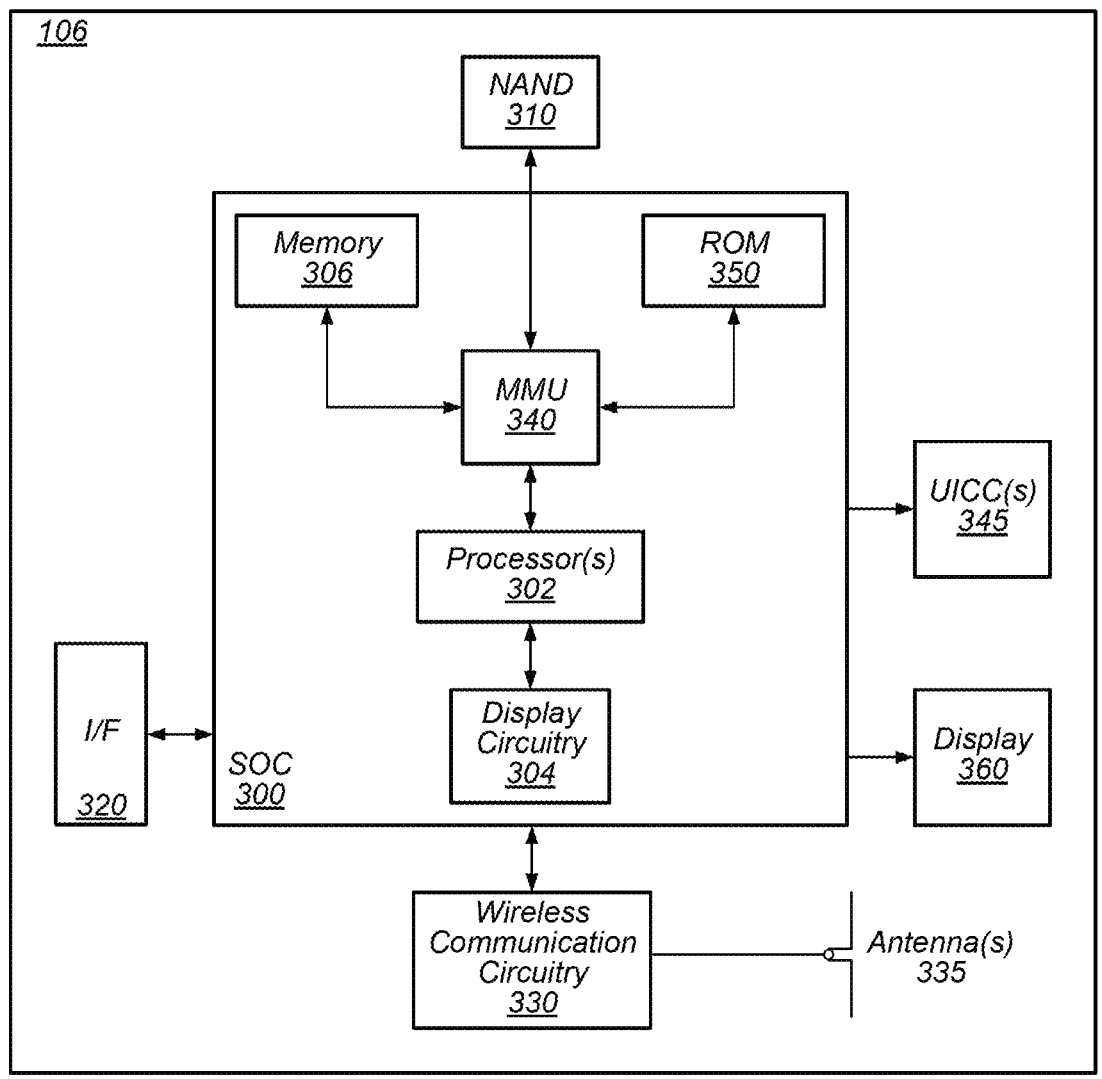
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
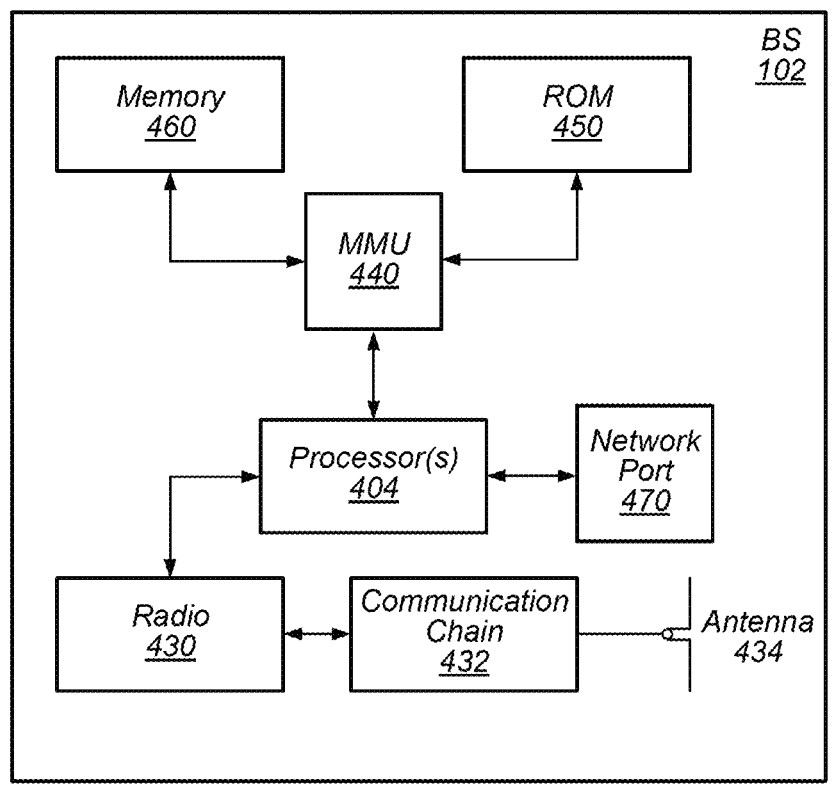
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
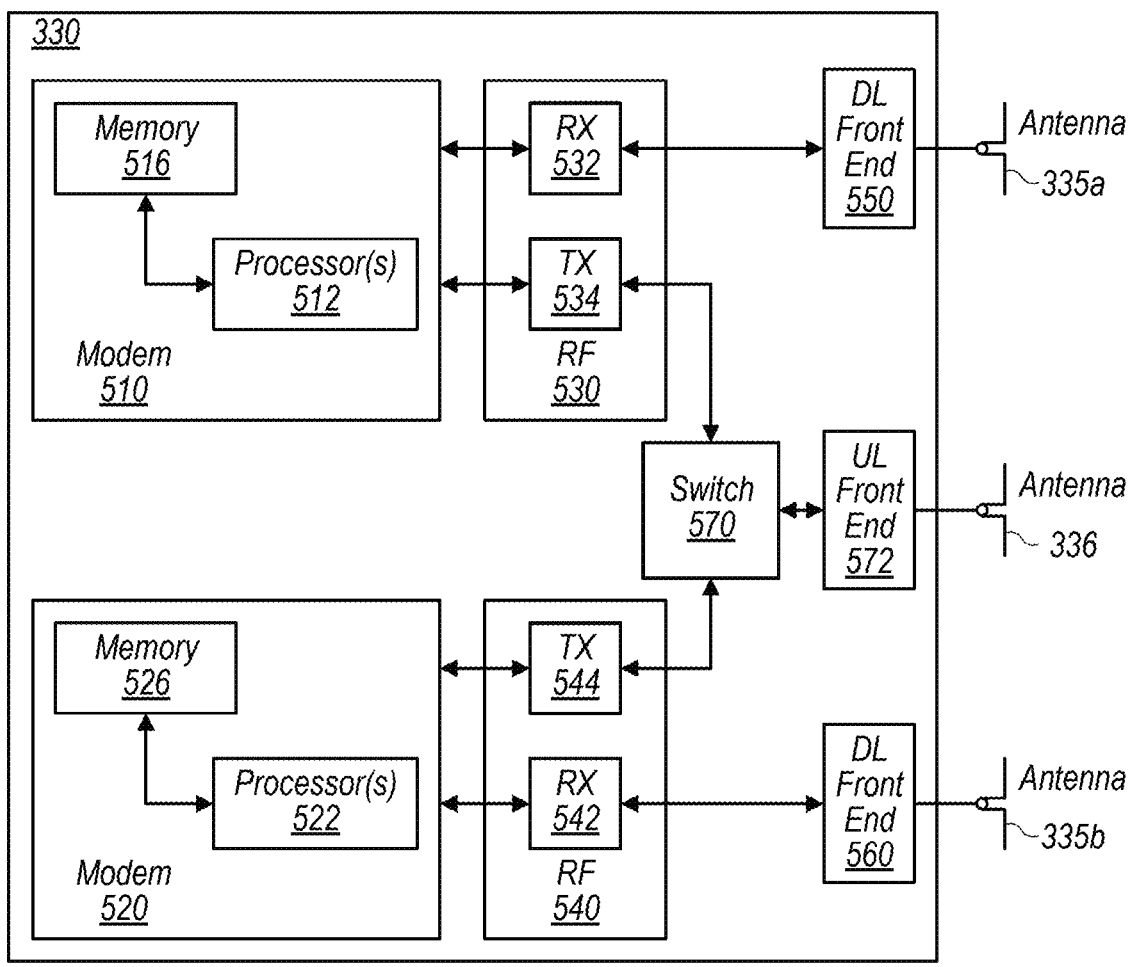
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
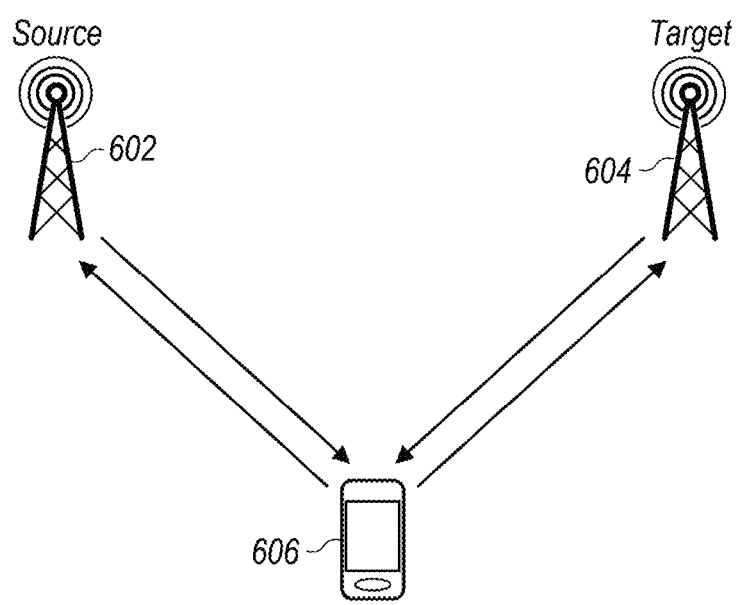
FIG. 6 illustrates aspects of an example possible dual active protocol stack handover, according to some embodiments.
Figure 7:
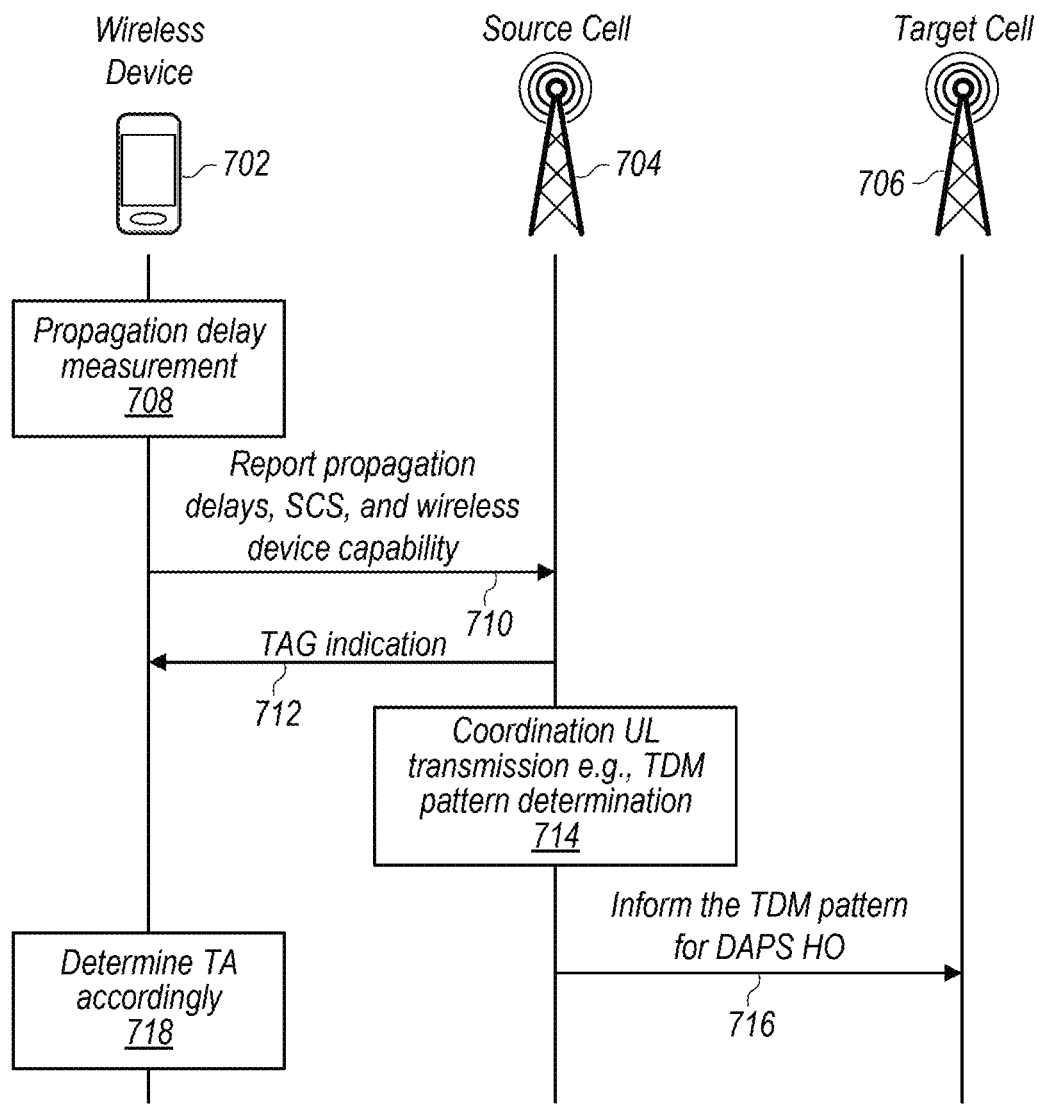
FIG. 7 is a communication flow diagram illustrating aspects of an example method for performing uplink transmissions during a dual active protocol stack handover, according to some embodiments.

FIGS. 6-7—Uplink Transmission for Dual Active Protocol Stack Handover

New cellular communication techniques are continually under development, to increase coverage, to better serve the range of demands and use cases, and for a variety of other reasons. One technique that is currently under development may include dual active protocol stack (DAPS) handover. This handover technique may include a wireless device maintaining both uplink and downlink links with both the source cell and the target cell of the handover, e.g., to potentially reduce any potential interruption to service when performing handover. FIG. 6 illustrates aspects of such a possible dual active protocol stack handover. In the illustrated example, a wireless device 606 may keep both uplink and downlink connections with both a source cell 602 and a target cell 604 during the handover operation.

In some instances, it may be possible that there is a difference in the propagation delay between the wireless device and the source cell and between the wireless device and the target cell when performing such a DAPS handover. Such differences could result in collisions between scheduled uplink transmissions of a wireless device, such that the wireless device could end up dropping one of the uplink transmissions, e.g., if the wireless device does not have sufficient hardware resources to perform both uplink transmissions simultaneously. Thus, it may be beneficial, at least in some instances, to provide techniques for scheduling uplink transmissions during dual active protocol stack handovers such that overlapping uplink transmissions can be avoided.

Accordingly, FIG. 7 is a communication flow diagram illustrating example aspects of such a method, at least according to some embodiments. Aspects of the method of FIG. 7 may be implemented by a wireless device 702 (such as a UE 106 illustrated in various of the Figures herein), source cell 704 and/or a target cell 706 (e.g., which may be provided by one or more base stations such as a BS 102 illustrated in various of the Figures herein), and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

It should be noted that while the techniques of FIG. 7 are described primarily in conjunction with DAPS handovers, various of the techniques described herein may also or alternatively be applicable in any of various other scenarios, such as in other scenarios in which a wireless device maintains simultaneous active uplink connections with multiple cells of a cellular network.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

In 708, a wireless device may measure the propagation delay between the wireless device and a source cell of the DAPS handover, as well as between the wireless device and a target cell of the DAPS handover. The propagation delays may be determined as part of radio resource management (RRM) measurements, in some embodiments.

In 710, the wireless device may report the measured propagation delays, the subcarrier spacing for each of the source cell and the target cell, and possibly wireless device capability information, e.g., relating to DAPS handover capabilities of the wireless device, such as whether the wireless device is capable of supporting DAPS handover, a propagation delay difference handling capability of the wireless device, and/or any of various other capability information. Note that if the wireless device indicates that it is not capable of supporting DAPS handover (or possibly if the wireless device does not report the capability to support DAPS handover), it may be the case that fallback to non-DAPS handover occurs, e.g., in which case the wireless device may keep only an uplink connection with the target cell.

At least according to some embodiments, the propagation delay difference handling capability may provide an indication of the difference between propagation delays that can be handled by the wireless device. For example, the propagation delay difference handling capability may include a value (or an index configured to indicate a value) indicative of the maximum difference in propagation delays between cells that the wireless device can handle without dropping an uplink transmission when switching uplink transmissions from one cell to another during a DAPS handover. Additionally or alternatively, the propagation delay difference handling capability may include any of various other types of indication related to the difference in propagation delays between cells that the wireless device can handle under certain circumstances. In some instances, the time difference between propagation delays that can be handled by the wireless device may be determined by the wireless device based at least in part on wireless device hardware capabilities. For example, the wireless device may determine whether it can handle a certain amount of delay difference (e.g., in a specified unit/quantity, such as one or multiple cyclic prefixes (CPs)) based at least in part on how many power amplifiers (PAs) are available for the uplink transmissions, and/or based at least in part on any of various other device characteristics.

In 712, the source cell may calculate the propagation time difference between the target cell and the source cell, may determine whether the source cell and the target cell are in the same timing advance group (TAG) for the wireless device, and may provide an indication of whether the source cell and the target cell are in the same TAG to the wireless device (e.g., a TAG indication). At least according to some embodiments, the source cell and the target cell may be considered in the same TAG if the difference in propagation delay to the wireless device of the source cell and the target cell is below a certain threshold. This may occur, for example, if the source cell and the target cell are collocated, or if the source cell and the target cell have approximately equal cell sizes and the wireless device is approximately equidistant between the source cell and the target cell, or possibly in any of various other scenarios.

In 714, the source cell may coordinate uplink transmission for the wireless device during the DAPS handover. This may include determining a time division multiplexing (TDM) communication pattern that allows the wireless device to perform uplink transmissions with both the source cell and the target cell in a time division multiplexed manner. In some instances, one or more guard periods may be included in the TDM communication pattern, e.g., based at least in part on the propagation time difference between the target cell and the source cell and the time difference between propagation delays that can be handled by the wireless device. For example, if the propagation time difference between the target cell and the source cell is greater than the time difference between propagation delays that can be handled by the wireless device, the source cell may include one or more guard periods when determining the TDM communication pattern, at least according to some embodiments.

The guard period(s) may be included to avoid the possibility that an overlap in transmission timing for two temporally adjacent communication slots could occur due to the propagation timing difference, which would be beyond the capability of the wireless device to handle. For example, it may be the case that a guard period is included in the TDM pattern after a communication slot for uplink transmission to the source cell and before a communication slot for uplink transmission to the target cell if the propagation delay between the wireless device and the target cell is greater than the propagation delay between the wireless device and the source cell by more than the propagation delay difference handling capability of the wireless device. Similarly, it may be the case that a guard period is included in the TDM pattern after a communication slot for uplink transmission to the target cell and before a communication slot for uplink transmission to the source cell if the propagation delay between the wireless device and the source cell is greater than the propagation delay between the wireless device and the target cell by more than the propagation delay difference handling capability of the wireless device. It may be the case that no guard period is included in the TDM pattern if the propagation delay difference is not greater than the propagation delay difference handling capability of the wireless device, for example if the source cell and the target cell are in the same TAG for the wireless device, or if the source cell and the target cell are not in the same TAG for the wireless device, but the difference in propagation delays of the source cell and the target cell is within the capability of the wireless device to handle without dropping an uplink transmission.

At least in some instances, the cellular base station that provides the source cell may determine the length of the guard period(s) based at least in part on the subcarrier spacing of the target cell (e.g., as reported to the source cell by the wireless device), as well as on the subcarrier spacing of the source cell. For example, the cellular base station that provides the source cell may select a guard period length corresponding to the length of a communication slot for whichever of the source cell or the target cell has a larger subcarrier spacing. The cellular base station that provides the source cell may select this guard period length to minimize any throughput losses due to the guard period inclusion while operating within the cellular communication system timing framework, at least according to some embodiments.

In 716, the source cell may inform the target cell of the TDM pattern determined by the source cell for the wireless device for the DAPS handover. The source cell and the target cell may schedule uplink transmissions for the wireless device during the DAPS handover in accordance with the determined TDM pattern. Thus, the source cell may schedule uplink transmissions between the wireless device and the source cell during communication slots of the TDM pattern that are specified as available for uplink transmissions to the source cell, and the target cell may schedule uplink transmissions between the wireless device and the target cell during communication slots of the TDM pattern that are specified as available for uplink transmissions to the target cell. It may be the case that neither cell schedules an uplink communication for the wireless device during guard periods of the TDM pattern, e.g., to attempt to avoid the possibility of an uplink transmission being dropped by the wireless device.

In 718, the wireless device may determine the TA to use for uplink transmissions to each of the source cell and the target cell. This may include determining separate TAs (e.g., using separate TA commands) for each of the source cell and the target cell if the source cell and the target cell are in different TAGs, or determining one TA (e.g., using one TA command) to use for both the source cell and the target cell if the source cell and the target cell are in the same TAG.

For example, if the wireless device receives an indication from the source cell that the source cell and the target cell are in the same TAG, the wireless device may receive a TA command from one of the source cell or the target cell, and may determine the timing advance for uplink transmissions to both of the source cell and the target cell based on the same TA command. If the wireless device receives an indication from the source cell that the source cell and the target cell are not in the same TAG, the wireless device may receive a first TA command from the source cell, determine the timing advance for uplink transmissions to the source cell based on the first TA command, separately receive a second TA command from the target cell, and determine the timing advance for uplink transmissions to the target cell based on the second TA command.

Thus, the method of FIG. 7 may be used by a wireless device to perform uplink transmissions with a cellular network during a DAPS handover, in such a manner that there may be no need to drop a colliding uplink transmission, e.g., by avoiding any such uplink transmission collisions and/or by determining that any uplink transmission collisions that may occur are within the capability of the wireless device to handle, at least according to some embodiments.

FIGS. 8-11 and Additional Information

FIGS. 8-11 illustrate further aspects that might be used in conjunction with the method of FIG. 7 if desired. It should be noted, however, that the exemplary details illustrated in and described with respect to FIGS. 8-11 are not intended to be limiting to the disclosure as a whole: numerous variations and alternatives to the details provided herein below are possible and should be considered within the scope of the disclosure.

One objective that may be targeted in cellular communication technology developments, potentially including in 3GPP cellular technologies such as LTE and NR, may include reducing any potential interruption time during cell handovers. One approach to meeting this objective may include developing and utilizing DAPS handover techniques. To support DAPS handover, a UE may need to keep UL and DL links with both the source cell and the target cell.

There may be numerous possible handover scenarios in which DAPS handover may be used, potentially including any or all of intra-frequency intra-band handover, inter-frequency handover, synchronous handover, and asynchronous handover. For intra-frequency asynchronous handover, it may be the case that the UE can only transmit on one UL link at a time. If the source cell and the target cell are non-collocated, and the cell radius difference is relatively large, the timing advance difference or gap between the source cell and the target cell could be substantial.

Figure 8:
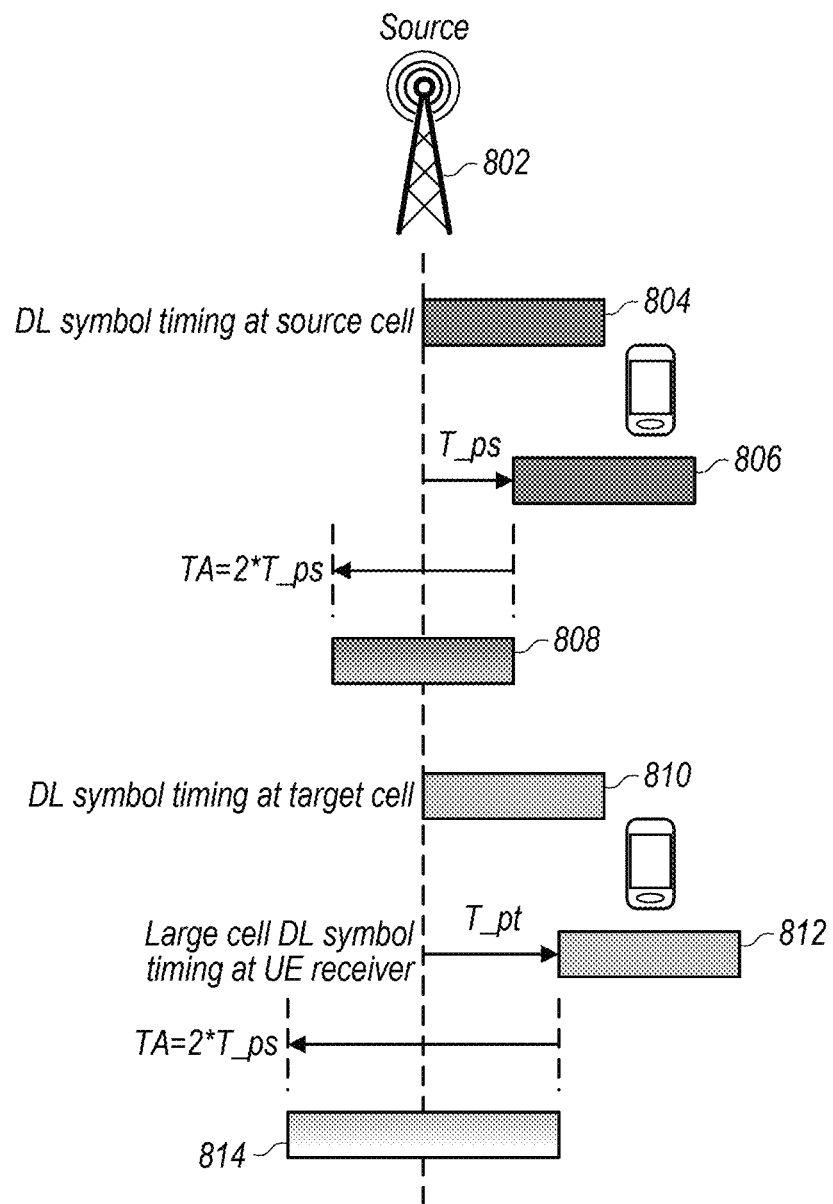
FIG. 8 illustrates aspects of an example approach to determining propagation delay between a wireless device and each of multiple cells, according to some embodiments.

As an example, FIG. 8 illustrates aspects of a possible approach to determining propagation delay between a wireless device and each of multiple cells, according to some embodiments. In the scenario illustrated in FIG. 8, in 804, a source cell may provide a downlink symbol to a UE with a certain timing. In 806, the UE may receive the source cell downlink symbol after a propagation delay of $T\_ps$. The UE may determine the timing advance for uplink transmissions to the source cell as 2*T_ps. In 808, the UE may perform an uplink transmission to the source cell using the timing advance for uplink transmissions to the source cell. In 810, a target cell may provide a downlink symbol to a UE with a certain timing. In 812, the UE may receive the target cell downlink symbol after a propagation delay of T_pt. The UE may determine the timing advance for uplink transmissions to the target cell as 2*T_pt. In 814, the UE may perform an uplink transmission to the target cell using the timing advance for uplink transmissions to the target cell. As illustrated in FIG. 8, it may be the case that the propagation delays for the source cell and the target cell (T_ps and T_pt), as well as the timing advances for the source cell and the target cell, may differ significantly.

In view of the potential for such a scenario, it may be beneficial to specify how a UE should determine which TA to use (or if multiple TAs should be used) for adjusting uplink transmission timing, and/or how to avoid the possibility of uplink transmissions overlapping temporally when performing uplink transmission switching from one cell to another.

According to some embodiments, as a first step to handling such a potential scenario, a UE may perform radio resource management (RRM) measurements, which may include measuring the propagation delay with the source cell and with the target cell. The UE may report the propagation delays, and may also report the propagation delay difference handling capability of the wireless device, to the source cell.

At least according to some embodiments, the propagation delay difference handling capability of the wireless device may include the amount of propagation delay difference for which the wireless device can still perform uplink transmissions in adjacent communication slots. Note that the propagation delay difference handling capability of the wireless device may be determined based at least in part on the hardware resources/capabilities of the wireless device. For example, as one possibility, it may be the case that a wireless device with a single power amplifier (PA) uplink transmission configuration may be able to handle a time difference of 0 μs. As another possibility, it may be the case that a wireless device with a multiple PA uplink transmission configuration may be able to handle a time difference that is greater than 0 μs. In some instances, the propagation delay difference handling capability may be reported in increments of a predefined value, such as the length of one cyclic prefix (CP).

The cellular base station (e.g., gNB) providing the source cell may calculate the propagation delay difference between the target cell and the source cell, and may determine whether the two cells are in the same TAG for the UE. If the two cells are in the same TAG, the UE may be able to maintain a single timeAlignmentTimer. The source cell may be able to determine a TDM uplink transmission pattern to coordinate the uplink transmissions of the wireless device without inserting any guard period(s) when switching between uplink transmissions from either cell to the other cell. The UE may be able to adjust its uplink transmission timing according to one TA command received during the uplink synchronization update process, and may ignore the TA command from the other cell (e.g., since they may be identical).

Otherwise (e.g., if the two cells are not in the same TAG), the UE may maintain separate timeAlignmentTimers for the source cell and the target cell. The source cell may be able to determine a TDM uplink transmission pattern to coordinate the uplink transmissions of the wireless device, which may include inserting a guard period when switching from uplink transmissions to the cell with the smaller propagation delay to the cell with the larger propagation delay, if the difference in propagation delay is greater than the propagation delay difference handling capability of the UE. Alternatively, if the difference in propagation delay is not greater than the propagation delay difference handling capability of the UE, it may be the case that the source cell does not insert any guard period when switching uplink transmissions between cells. The UE may be able to adjust its uplink transmission timing for the source cell and the target cell separately, e.g., according to the respective TA commands received during the uplink synchronization update process.

The possibility of adding a guard period in the TDM uplink transmission pattern may be used to avoid the possibility of a colliding (e.g., overlapping, due to the propagation time difference) uplink transmission being dropped by the UE. For example, due to the different TAs for the source cell and the target cell, when uplink transmission is switched from one cell to the other, it could cause an overlap in the transmission times, which could result in one of the transmissions being dropped, e.g., if the UE does not have the hardware capability to handle such an overlap in transmission times, such as might be the case for a UE with a single PA uplink transmission configuration for an intra-frequency asynchronous handover.

FIGS. 9-11 illustrate various possible TDM patterns that might be selected by a source cell in various scenarios, e.g., depending on the measured transmission delay to the UE. As shown in FIG. 9, if the target cell and the source cell are in the same TAG, there may be no need to insert a guard period when switching uplink transmissions between cells. As shown in FIG. 10, if the target cell and the source cell are in different TAGs, and T_ps<T_pt, a guard period may be included in the TDM pattern when uplink transmission by the UE switches from the source cell to the target cell. As shown in FIG. 11, if the target cell and the source cell are in different TAGs, and T_ps>T_pt, a guard period may be included in the TDM pattern when uplink transmission by the UE switches from the target cell to the source cell. At least according to some embodiments, the guard period may have a length of at least one communication slot, e.g., according to the cell with the shorter slot length/larger subcarrier spacing (e.g., max{source SCS, target SCS}).

Note that it may be possible, in some instances, that a UE does not report having the capability to support DAPS handover. In such a scenario, fallback to non-DAPS handover may occur, e.g., such that the UE may keep the uplink with the target cell, at least according to some embodiments.

Note also that the techniques described herein may be applied to either or both of NR and LTE DAPS handover, according to various embodiments.

In the following further exemplary embodiments are provided.

One set of embodiments may include a cellular base station configured to provide a first cell, comprising: at least one antenna; at least one radio coupled to the at least one antenna; and a processor coupled to the at least one radio; wherein the cellular base station is configured to: receive an indication from a wireless device of a propagation delay between the wireless device and the first cell, a propagation delay between the wireless device and a second cell, and a propagation delay difference handling capability of the wireless device, wherein the first cell is a source cell of a dual active protocol stack (DAPS) handover by the wireless device, wherein the second cell is a target cell of the DAPS handover; and determine a time division multiplexing (TDM) pattern for uplink communication for the wireless device during the DAPS handover, wherein the TDM pattern is determined based at least in part on the propagation delay between the wireless device and the first cell, the propagation delay between the wireless device and the second cell, and the propagation delay difference handling capability of the wireless device.

According to some embodiments, the cellular base station is further configured to: receive an indication from the wireless device that the wireless device can support DAPS handover, wherein determination of the TDM pattern for uplink communication for the wireless device during the DAPS handover is performed based at least in part on the indication from the wireless device that the wireless device can support DAPS handover.

According to some embodiments, to determine the TDM pattern for uplink communication for the wireless device during the DAPS handover, the cellular base station is further configured to: determine a propagation delay difference for the wireless device, wherein the propagation delay difference comprises a difference between the propagation delay between the wireless device and the first cell and the propagation delay between the wireless device and the second cell; and insert at least one guard period in the TDM pattern if the propagation delay difference is greater than the propagation delay difference handling capability of the wireless device, wherein no guard period is inserted in the TDM pattern if the propagation delay difference is not greater than the propagation delay difference handling capability of the wireless device.

According to some embodiments, the cellular base station is further configured to: insert a guard period in the TDM pattern after a communication slot for uplink transmission to the first cell and before a communication slot for uplink transmission to the second cell if the propagation delay between the wireless device and the second cell is greater than the propagation delay between the wireless device and the first cell by more than the propagation delay difference handling capability of the wireless device.

According to some embodiments, the cellular base station is further configured to: insert a guard period in the TDM pattern after a communication slot for uplink transmission to the second cell and before a communication slot for uplink transmission to the first cell if the propagation delay between the wireless device and the first cell is greater than the propagation delay between the wireless device and the second cell by more than the propagation delay difference handling capability of the wireless device.

According to some embodiments, the cellular base station is further configured to: provide an indication to the second cell of the TDM pattern for uplink communication for the wireless device during the DAPS handover.

According to some embodiments, the cellular base station is further configured to: schedule uplink transmissions for the wireless device during the DAPS handover in accordance with the determined TDM pattern for uplink communication for the wireless device during the DAPS handover.

According to some embodiments, the cellular base station is further configured to: determine whether the first cell and the second cell are in a same timing advance group for the wireless device based at least in part on the propagation delay between the wireless device and the first cell and the propagation delay between the wireless device and a second cell; and provide an indication to the wireless device of whether the first cell and the second cell are in the same timing advance group for the wireless device.

Another set of embodiments may include a method, comprising: by a cellular base station configured to provide a first cell: receiving an indication from a wireless device of a propagation delay between the wireless device and the first cell, a propagation delay between the wireless device and a second cell, and a propagation delay difference handling capability of the wireless device, wherein the first cell is a source cell of a dual active protocol stack (DAPS) handover by the wireless device, wherein the second cell is a target cell of the DAPS handover; and determining a time division multiplexing (TDM) pattern for uplink communication for the wireless device during the DAPS handover, wherein the TDM pattern is determined based at least in part on the propagation delay between the wireless device and the first cell, the propagation delay between the wireless device and the second cell, and the propagation delay difference handling capability of the wireless device.

According to some embodiments, determining the TDM pattern for uplink communication for the wireless device during the DAPS handover further comprises: determining a propagation delay difference for the wireless device, wherein the propagation delay difference comprises a difference between the propagation delay between the wireless device and the first cell and the propagation delay between the wireless device and the second cell; and including at least one guard period in the TDM pattern if the propagation delay difference is greater than the propagation delay difference handling capability of the wireless device.

According to some embodiments, a guard period is included in the TDM pattern after a communication slot for uplink transmission to the first cell and before a communication slot for uplink transmission to the second cell if the propagation delay between the wireless device and the second cell is greater than the propagation delay between the wireless device and the first cell by more than the propagation delay difference handling capability of the wireless device, wherein a guard period is included in the TDM pattern after a communication slot for uplink transmission to the second cell and before a communication slot for uplink transmission to the first cell if the propagation delay between the wireless device and the first cell is greater than the propagation delay between the wireless device and the second cell by more than the propagation delay difference handling capability of the wireless device, wherein no guard period is included in the TDM pattern if the propagation delay difference is not greater than the propagation delay difference handling capability of the wireless device.

According to some embodiments, the method further comprises: receiving an indication from the wireless device of subcarrier spacing for the second cell; and determining a length of the at least one guard period based at least in part on the subcarrier spacing for the second cell.

According to some embodiments, the method further comprises: providing an indication to the second cell of the TDM pattern for uplink communication for the wireless device during the DAPS handover.

According to some embodiments, the method further comprises: determining whether the first cell and the second cell are in a same timing advance group for the wireless device, wherein the first cell and the second cell are determined to be in the same timing advance group if the difference in propagation delay between the wireless device and the first cell and propagation delay between the wireless device and a second cell is less than a predetermined threshold, wherein the first cell and the second cell are determined to not be in the same timing advance group if the difference in propagation delay between the wireless device and the first cell and propagation delay between the wireless device and a second cell is greater than the predetermined threshold; and providing an indication to the wireless device of whether the first cell and the second cell are in the same timing advance group for the wireless device.

Yet another set of embodiments may include a wireless device, comprising: at least one antenna; at least one radio coupled to the at least one antenna; and a processor coupled to the at least one radio; wherein the wireless device is configured to: determine a propagation delay between the wireless device and a first cell, wherein the first cell is a source cell of a dual active protocol stack (DAPS) handover; determine a propagation delay between the wireless device and a second cell, wherein the second cell is a target cell of the DAPS handover; and provide an indication to the first cell of the propagation delay between the wireless device and the first cell, the propagation delay between the wireless device and the second cell, and a propagation delay difference handling capability of the wireless device.

According to some embodiments, the wireless device is further configured to: receive an indication from the first cell of whether the first cell and the second cell are in a same timing advance group; and determine a timing advance for uplink transmissions to each of the first cell and the second cell based at least in part on whether the first cell and the second cell are in the same timing advance group, wherein if the first cell and the second cell are in the same timing advance group, the timing advance for uplink transmissions to the first cell and the timing advance for uplink transmissions to the second cell are the same, wherein if the first cell and the second cell are not in the same timing advance group, the timing advance for uplink transmissions to the first cell and the timing advance for uplink transmissions to the second cell are different.

According to some embodiments, the wireless device is further configured to: receive an indication from the first cell that the first cell and the second cell are in a same timing advance group; receive a timing advance command from one of the first cell or the second cell; and determine a timing advance for uplink transmissions to both of the first cell and the second cell based at least in part on the timing advance command.

According to some embodiments, the wireless device is further configured to: receive an indication from the first cell that the first cell and the second cell are not in a same timing advance group; receive a first timing advance command, wherein the first timing advance command is received from the first cell; determine a timing advance for uplink transmissions to the first cell based at least in part on the first timing advance command; receive a second timing advance command, wherein the second timing advance command is received from the second cell; and determine a timing advance for uplink transmissions to the second cell based at least in part on the second timing advance command.

According to some embodiments, the wireless device is further configured to: provide an indication that the wireless device supports DAPS handover to the first cell.

According to some embodiments, the wireless device is further configured to: determine subcarrier spacing for the second cell; and provide an indication of the subcarrier spacing for the second cell to the first cell.

Still another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

A yet further exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cellular base station configured to provide a first cell, comprising:
at least one antenna;
at least one radio coupled to the at least one antenna; and
a processor coupled to the at least one radio;
wherein the cellular base station is configured to:
receive an indication from a wireless device of a propagation delay between the wireless device and the first cell, a propagation delay between the wireless device and a second cell, and a propagation delay difference handling capability of the wireless device, wherein the first cell is a source cell of a dual active protocol stack (DAPS) handover by the wireless device, wherein the second cell is a target cell of the DAPS handover; and determine a time division multiplexing (TDM) pattern for uplink communication for the wireless device during the DAPS handover, wherein the TDM pattern is determined based at least in part on the propagation delay between the wireless device and the first cell, the propagation delay between the wireless device and the second cell, and the propagation delay difference handling capability of the wireless device, wherein to determine the TDM pattern for uplink communication for the wireless device during the DAPS handover, the cellular base station is further configured to:

determine a propagation delay difference for the wireless device, wherein the propagation delay difference comprises a difference between the propagation delay between the wireless device and the first cell and the propagation delay between the wireless device and the second cell; and insert at least one guard period in the TDM pattern if the propagation delay difference is greater than the propagation delay difference handling capability of the wireless device, wherein no guard period is inserted in the TDM pattern if the propagation delay difference is not greater than the propagation delay difference handling capability of the wireless device.

2. The cellular base station of claim 1, wherein the cellular base station is further configured to:

receive an indication from the wireless device that the wireless device can support DAPS handover, wherein determination of the TDM pattern for uplink communication for the wireless device during the DAPS handover is performed based at least in part on the indication from the wireless device that the wireless device can support DAPS handover.

3. The cellular base station of claim 1, wherein the cellular base station is further configured to:

insert a guard period in the TDM pattern after a communication slot for uplink transmission to the first cell and before a communication slot for uplink transmission to the second cell if the propagation delay between the wireless device and the second cell is greater than the propagation delay between the wireless device and the first cell by more than the propagation delay difference handling capability of the wireless device.

4. The cellular base station of claim 1, wherein the cellular base station is further configured to:

insert a guard period in the TDM pattern after a communication slot for uplink transmission to the second cell and before a communication slot for uplink transmission to the first cell if the propagation delay between the wireless device and the first cell is greater than the propagation delay between the wireless device and the second cell by more than the propagation delay difference handling capability of the wireless device.

5. The cellular base station of claim 1, wherein the cellular base station is further configured to:

provide an indication to the second cell of the TDM pattern for uplink communication for the wireless device during the DAPS handover.

6. The cellular base station of claim 1, wherein the cellular base station is further configured to:

schedule uplink transmissions for the wireless device during the DAPS handover in accordance with the determined TDM pattern for uplink communication for the wireless device during the DAPS handover.

7. The cellular base station of claim 1, wherein the cellular base station is further configured to:

determine whether the first cell and the second cell are in a same timing advance group for the wireless device based at least in part on the propagation delay between the wireless device and the first cell and the propagation delay between the wireless device and a second cell; and provide an indication to the wireless device of whether the first cell and the second cell are in the same timing advance group for the wireless device.

8. A method, comprising:

by a cellular base station configured to provide a first cell:

receiving an indication from a wireless device of a propagation delay between the wireless device and the first cell, a propagation delay between the wireless device and a second cell, and a propagation delay difference handling capability of the wireless device, wherein the first cell is a source cell of a dual active protocol stack (DAPS) handover by the wireless device, wherein the second cell is a target cell of the DAPS handover; and determining a time division multiplexing (TDM) pattern for uplink communication for the wireless device during the DAPS handover, wherein the TDM pattern is determined based at least in part on the propagation delay between the wireless device and the first cell, the propagation delay between the wireless device and the second cell, and the propagation delay difference handling capability of the wireless device, wherein determining the TDM pattern for uplink communication for the wireless device during the DAPS handover further comprises:

determining a propagation delay difference for the wireless device, wherein the propagation delay difference comprises a difference between the propagation delay between the wireless device and the first cell and the propagation delay between the wireless device and the second cell; and including at least one guard period in the TDM pattern if the propagation delay difference is greater than the propagation delay difference handling capability of the wireless device.

9. The method of claim 8, wherein a guard period is included in the TDM pattern after a communication slot for uplink transmission to the first cell and before a communication slot for uplink transmission to the second cell if the propagation delay between the wireless device and the second cell is greater than the propagation delay between the wireless device and the first cell by more than the propagation delay difference handling capability of the wireless device, wherein a guard period is included in the TDM pattern after a communication slot for uplink transmission to the second cell and before a communication slot for uplink transmission to the first cell if the propagation delay between the wireless device and the first cell is greater than the propagation delay between the wireless device and the second cell by more than the propagation delay difference handling capability of the wireless device, wherein no guard period is included in the TDM pattern if the propagation delay difference is not greater than the propagation delay difference handling capability of the wireless device.

10. The method of claim 8, wherein the method further comprises:
receiving an indication from the wireless device of subcarrier spacing for the second cell; and
determining a length of the at least one guard period based at least in part on the subcarrier spacing for the second cell.

11. The method of claim 8, wherein the method further comprises:
providing an indication to the second cell of the TDM pattern for uplink communication for the wireless device during the DAPS handover.

12. The method of claim 8, wherein the method further comprises:
determining whether the first cell and the second cell are in a same timing advance group for the wireless device,
wherein the first cell and the second cell are determined to be in the same timing advance group if the difference in propagation delay between the wireless device and the first cell and propagation delay between the wireless device and a second cell is less than a predetermined threshold,
wherein the first cell and the second cell are determined to not be in the same timing advance group if the difference in propagation delay between the wireless device and the first cell and propagation delay between the wireless device and a second cell is greater than the predetermined threshold; and
providing an indication to the wireless device of whether the first cell and the second cell are in the same timing advance group for the wireless device.

13. A wireless device, comprising:
at least one antenna;
at least one radio coupled to the at least one antenna; and
a processor coupled to the at least one radio;
wherein the wireless device is configured to:
determine a propagation delay between the wireless device and a first cell, wherein the first cell is a source cell of a dual active protocol stack (DAPS) handover;
determine a propagation delay between the wireless device and a second cell, wherein the second cell is a target cell of the DAPS handover;
provide an indication to the first cell of the propagation delay between the wireless device and the first cell, the propagation delay between the wireless device and the second cell, and a propagation delay difference handling capability of the wireless device
receive an indication from the first cell of whether the first cell and the second cell are in a same timing advance group; and
determine a timing advance for uplink transmissions to each of the first cell and the second cell based at least in part on whether the first cell and the second cell are in the same timing advance group,
wherein if the first cell and the second cell are in the same timing advance group, the timing advance for uplink transmissions to the first cell and the timing advance for uplink transmissions to the second cell are the same,
wherein if the first cell and the second cell are not in the same timing advance group, the timing advance for uplink transmissions to the first cell and the timing advance for uplink transmissions to the second cell are different.

14. The wireless device of claim 13, wherein the wireless device is further configured to:
receive an indication from the first cell that the first cell and the second cell are in a same timing advance group;
receive a timing advance command from one of the first cell or the second cell;
determine a timing advance for uplink transmissions to both of the first cell and the second cell based at least in part on the timing advance command; and
adjust uplink transmission timing for uplink transmissions to each of the first cell and the second cell using the determined timing advance for uplink transmissions to both of the first cell and the second cell during the DAPS handover.

15. The wireless device of claim 13, wherein the wireless device is further configured to:
receive an indication from the first cell that the first cell and the second cell are not in a same timing advance group;
receive a first timing advance command, wherein the first timing advance command is received from the first cell;
determine a timing advance for uplink transmissions to the first cell based at least in part on the first timing advance command;
adjust uplink transmission timing for uplink transmissions to the first cell using the determined timing advance for uplink transmissions to the first cell during the DAPS handover;
receive a second timing advance command, wherein the second timing advance command is received from the second cell;
determine a timing advance for uplink transmissions to the second cell based at least in part on the second timing advance command; and
adjust uplink transmission timing for uplink transmissions to the second cell using the determined timing advance for uplink transmissions to the second cell during the DAPS handover.

16. The wireless device of claim 13, wherein the wireless device is further configured to:
provide an indication that the wireless device supports DAPS handover to the first cell.

17. The wireless device of claim 13, wherein the wireless device is further configured to:
determine subcarrier spacing for the second cell; and
provide an indication of the subcarrier spacing for the second cell to the first cell.

* * * * *